United States Patent
Van De Velde et al.

(10) Patent No.: US 11,323,280 B2
(45) Date of Patent: May 3, 2022

(54) NETWORK NODE FOR NETWORK BASED MULTICAST REPLICATION

(71) Applicant: Alcatel Lucent, Nozay (FR)

(72) Inventors: Gunter Van De Velde, Antwerp (BE); Andrew Dolganow, Singapore (SG); Praveen Muley, Mountain View, CA (US); Wim Henderickx, Westerlo (BE); Adam Simpson, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 331 days.

(21) Appl. No.: 15/778,835

(22) PCT Filed: Dec. 19, 2016

(86) PCT No.: PCT/EP2016/081653
§ 371 (c)(1),
(2) Date: May 24, 2018

(87) PCT Pub. No.: WO2017/108654
PCT Pub. Date: Jun. 29, 2017

(65) Prior Publication Data
US 2018/0343137 A1  Nov. 29, 2018

(30) Foreign Application Priority Data
Dec. 22, 2015 (EP) .................................... 15290330

(51) Int. Cl.
*H04L 12/18* (2006.01)
*H04L 45/16* (2022.01)
(Continued)

(52) U.S. Cl.
CPC ........ *H04L 12/1854* (2013.01); *H04L 12/185* (2013.01); *H04L 45/16* (2013.01); *H04L 45/507* (2013.01); *H04L 47/15* (2013.01)

(58) Field of Classification Search
CPC ... H04L 12/1854; H04L 45/16; H04L 12/185; H04L 47/15; H04L 45/507
(Continued)

(56) References Cited

U.S. PATENT DOCUMENTS

2005/0169266 A1* 8/2005 Aggarwal ............. H04L 45/507
370/389
2006/0256768 A1* 11/2006 Chan ....................... H04L 45/28
709/238

(Continued)

OTHER PUBLICATIONS

Examination Report dated Sep. 23, 2019, issued in corresponding European Application No. 15 290 330.8.
(Continued)

*Primary Examiner* — Christopher M Crutchfield
*Assistant Examiner* — Jean F Voltaire
(74) *Attorney, Agent, or Firm* — Harness, Dickey & Pierce, P.L.C.

(57) ABSTRACT

A network node adapted to forward incoming data packets, the network node including a tag identifying unit, adapted to identify a tag of an incoming data packet as a replicate tag; a tag look-up module, adapted to retrieve from a tag table a number of replications and destinations for the replicate tag; a replicating engine, configured to replicate the incoming data packet according to the number of replications, thereby generating replicated data packets; and a forwarding unit, adapted to forward the replicated data packets to the destinations.

13 Claims, 8 Drawing Sheets

(51) Int. Cl.
 *H04L 45/50* (2022.01)
 *H04L 47/10* (2022.01)
(58) Field of Classification Search
 USPC .......................................................... 370/351
 See application file for complete search history.

(56) References Cited

U.S. PATENT DOCUMENTS

2008/0267078 A1* 10/2008 Farinacci ................ H04L 45/02
 370/244
2015/0138961 A1* 5/2015 Wijnands ................ H04L 45/22
 370/228
2015/0365319 A1* 12/2015 Finn .................... H04L 41/0668
 370/221

OTHER PUBLICATIONS

International Search Report PCT/ISA/210 for International Application No. PCT/EP2016/081653 Dated Mar. 15, 2017.
Written Opinion of the International Searching Authority PCT/ISA/237 for International Application No. PCT/EP2016/081653 dated Mar. 15, 2017.

* cited by examiner

NETWORK NODE FOR NETWORK BASED MULTICAST REPLICATION

CROSS-REFERENCE TO RELATED APPLICATIONS

This application is a national phase under 35 U.S.C. § 371 of PCT International Application No. PCT/EP2016/081653 which has an International filing date of Dec. 19, 2016, which claims priority to European Application No. 15290330.8, filed Dec. 22, 2015, the entire contents of each of which are hereby incorporated by reference.

The present invention relates to the field of traffic engineering and in particular in the field of multicast replication mechanisms.

BACKGROUND

In computer networking, multicast is a group communication where information is addressed to a group of destination computers simultaneously. Contrary to unicast transmission, there exists in multicast transmission no direct connection between the source of the data packets and the destinations. Multicast distribution, i.e. the one-to-many or many-to-many distribution, uses the most efficient strategy to deliver data packets over each link of the network only once, and create copies only when the links to the destinations split. When the network cannot perform the replication of the data packets at the most efficient point of the network, the trade-off is to send multiple copies towards each destination. This wastes bandwidth in the network and burdens each router involved.

Current multicast replication mechanisms are based upon Protocol-Independent Multicast distribution trees, also referred to as PIM distribution trees. PIM is a family of multicast routing protocols for Internet Protocol networks or IP networks that provide one-to-many and many-to-many distribution of data packets over a LAN, WAN or the Internet. It is termed protocol-independent because PIM does not include its own topology discovery mechanism, but instead uses routing information supplied by other routing protocols. The solutions for multicast replication mechanisms relying on PIM build a distribution tree based upon a shortest path distribution algorithm.

Multicast replication mechanisms based upon PIM distribution trees have none or little capability to expose traffic engineering capabilities. Additionally, when using these technologies, all nodes within the network should support these technologies which makes its deployment non-trivial, represents a significant network upgrade and introduces the complexity of additional protocols.

Current multicast replication mechanisms are also based upon a Provider Multicast Service Interface, also referred to as PMSI. Technologies such as Resource Reservation Protocol—Traffic Engineering, also referred to as RSVP-TE PMSI can be deployed to increase traffic engineering capabilities. Applications running on IP networks can use RSVP-TE to indicate to other nodes for example the bandwidth, the jitter, the maximum burst, etc. of the data packet streams they want to receive.

Even though the use of RSVP-TE PMSI can be implemented to increase traffic engineering capabilities, such mechanism results in further deployment complexities. This sometimes leads network operators to deploy ingress replication that allows unicast forwarding in the network but that comes at the cost of additional bandwidth usage in the network.

Segment routing, as described in the Internet-Draft by the Network Working Group, available at http://tools.ietf.org/html/draft-ietf-spring-segment-routing-06 published on Oct. 14, 2015, proposes a solution on how traditional shortest path unicast forwarding routing is enhanced to allow unicast paths to be traffic engineered in the network. Segment routing leverages the source routing paradigm. With segment routing, a node steers a data packet through an ordered list of instructions, called segments. A segment can represent any instruction, topological or service-based. A segment can have a local semantic to a segment routing node or global within a segment routing domain. Segment routing allows to enforce a flow through any topological path and service chain while maintaining per-flow state only at the ingress node to the segment routing domain.

Multiprotocol Label Switching, also referred to as MPLS, is a scalable, protocol-independent transport. In an MPLS network, data packets are assigned labels. Packet-forwarding decisions are made solely on the contents of this label, without the need to examine the packet itself. Segment Routing can be directly applied to the MPLS architecture with no change on the forwarding plane. A segment may then be encoded as an MPLS label. An ordered list of segments is encoded as a stack of labels. The segment to process is on the top of the stack. Upon completion of a segment, the related label is popped from the stack. Segment Routing can also be applied to the IPv6 architecture, with a new type of routing extension header. A segment may then be encoded as an IPv6 address. An ordered list of segments is encoded as an ordered list of IPv6 addresses in the routing extension header. The segment to process is indicated by a pointer in the routing extension header. Upon completion of a segment, the pointer is incremented.

SUMMARY OF THE INVENTION

However, the existing segment routing architecture as described in the Internet-Draft does not propose any definition or any architectural description for network based data packet replication.

It is an objective to disclose a network node and the related method that overcome the above identified shortcomings of existing solutions. More particularly, it is an objective to disclose such a network node for allowing network based data packet replication while increasing traffic engineering capabilities in a simple manner.

According to a first aspect of the invention, the above defined objectives are realized by a network node adapted to forward incoming data packets, the network node comprising;
  a tag identifying unit, adapted to identify a tag of an incoming data packet as a replicate tag;
  a tag look-up module, adapted to retrieve from a tag table a number of replications and destinations for the replicate tag;
  a replicating engine, configured to replicate the incoming data packet according to the number of replications, thereby generating replicated data packets; and
  a forwarding unit, adapted to forward the replicated data packets to the destinations.

In accordance with the present invention, the replication of an incoming data packet by a network node is provided by the usage of a replicate tag. The replicate tag allows the network node to accept an ingress data packet and replicate this incoming data packet towards multiple destinations based upon the configured policies of its replicate tag. The use of a replicate tag according to the present invention therefore allows the building of engineered multicast distribution trees while minimizing the network state. This way, a service tree supports unicast traditional path engineering as described in the Internet-Draft and the capability to allow network based data packet replication to optimise traffic distribution trees in a programmatic approach allowing optimised traffic engineering.

Using a replicate tag according to the present invention allows the network node to perform traffic engineered network replication combining all the programmability provided by the segment routing as described in the Internet-Draft into the realm of multicast and network based packet replication. Using replicate tags indeed allows the distribution tree to be engineered based upon a traditional multicast distribution technology or by means of controller based programming of the distribution tree structure. The flows between replication points follow traditional unicast paths. Therefore, the resiliency demonstrated by this solution is similar to the resiliency currently demonstrated by traditional unicast segment routing framework. Additionally, the resiliency service is enhanced by the possible existence of several live-live flows of the same flow of data packets. Indeed, a network node according to the present invention may replicate an incoming data packet and forward both the incoming data packet and the one or more replicated data packets to the same destination, but following different paths. When leaving the network, the one or more copies of the incoming data packet and the incoming data packet are merged and reduced to the single original stream. Several flows of identical data packets will then flow in the network simultaneously and according to different paths, in order to increase the probability that the incoming data packet reaches its destination. Indeed, if a network node fails forwarding the incoming data packet, a copy of the incoming data packet will still flow in the network. Furthermore, the decoupling of the IP headers from the replication design in to the present invention allows the orchestration of the distribution tree. The replication tree for the incoming data packet is defined by the first tag that is imposed upon the incoming data packet. If the first tag is a traditional tag, such as for example a traditional segment routing identifier, then the incoming data packet is forwarded as traditional segment routing, while if the incoming data packet is imposed with a replicate tag, then the incoming data packet will be replicated by a network node according to the present invention upon the programmed distribution tree. Between network nodes which are configured to replicate incoming data packets according to their replicate tags, the data packets are unicast forwarded along the path following specification in the Internet-Draft routing. Additionally, traffic engineering in a network comprising one or more network nodes according to the present invention is possible by both the end-user and the service provider thanks to the use of replicate tags. In addition, an optimization of the path followed by an incoming data packet in the network is possible thanks to the use of replicate tags. The incoming data packet will indeed always follow the shortest path between a network node according to the present invention and the next network node towards its destination. Additionally, a network node according to the present invention minimizes the workload of virtual machines, performing the replication of data packets sent by the virtual machine instead of by the virtual machines themselves, and thereby ensuring the performance of the virtual machines which are not optimized for packet replication.

A network node according to the present invention is adapted to identify a tag of an incoming data packet as a replicate tag. In other words, a network node that does not comprise a tag identifying unit is not able to distinguish a replicate tag from another tag of a data packet and therefore is not able to identify a replicate tag. In this case, the network node will then not replicate the incoming data packet and will only forward it to a destination as indicated in the tag. Using replicate tags according to the present invention therefore allows to achieve network based replication with backward unicast segment routing compatibility.

A replicate tag may for example be a replicate segment identifier, also referred to as replicate segment ID. A replicate tag is adapted to indicate whether a data packet must be replicated. In other words, when a network identifies a replicate tag of a data packet, the network node becomes aware that the data packet must be replicated. A number of replications may for example be one replication, two replications, three replications, etc. Alternatively, the number of replications may be tens of replications, hundreds of replications, etc. The replication engine is configured to copy the incoming data packet according to the number of replications, thereby generating replicated data packets that are copies of the incoming data packet, i.e. identical to the incoming data packet. The forwarding unit is adapted to forward the replicated data packets to the destinations. The destinations may be clients or end-destinations of the multicast flow, may be network nodes like intermediate nodes that again have to replicate the data packet, or may be the output ports of the current network node. According to the present invention, the forwarding unit is adapted to forward one replicated data packet to a destination. Alternatively, the forwarding unit is adapted to forward more than one replicated data packet to a destination. According to the present invention, if the tag look-up module is not able to retrieve from a tag table a number of replications and destinations for the replicate tag, for example if there exist no number of replications and destinations for the replicate tag in the tag table, the network node according to the present invention is adapted to drop the incoming data packet.

According to an optional aspect of the invention, the replicate tag is a replicate segment identifier, or replicate segment ID.

The usage of replicate segments allows gradual introduction of multicast flow handling in accordance with the present invention. Indeed, routers or switches on the path between two network nodes according to the present invention are just switching incoming data packets based upon the outer segments, which to them is identical to traditional segment routing segments. On the other hand, on the network nodes according to the present invention, the outer segments, corresponding to the replicate segment ID, represent a replication context. This technology aspect makes this multicast programmability very powerful to support programmable network based packet replication. Additionally no new multicast-specific protocols are required anymore making deployment easier to manage.

The existing technologies also tend to have a close correlation between the multicast IP address and the selected distribution tree. Using replicate segment IDs allows decoupling that, and can have a packet with a single IP unicast destination address replicated by the network towards multiple paths towards multiple destinations. This allows new functionality of network based Anycast and highly resilient based live-live unicast flows and monitoring.

According to an optional aspect of the invention, the tag table is manually configured.

This way, traffic engineering in a network comprising one or more network nodes according to the present invention is possible by both the end-user and the service provider thanks to the use of replicate tags and of the tag table.

According to an optional aspect of the invention, the network node further comprises a traffic flow controlling unit, adapted to configure the tag table.

This way, the distribution tree can then be built by distributed network element compute design. Network nodes being adapted to replicate data packets each comprise a traffic flow controlling unit adapted to configure a tag table. In other words, each network node adapted to replicate data packets looks up a tag table to retrieve a number of replications and destinations for the replicate tag. The traffic flow controlling unit is further adapted to configure tag table updates, thereby updating the tag table of the respective network node. This way, the tag table of a network node is dynamically updated by the traffic flow controlling unit. Alternatively, the multicast distribution tree could be created using traditional multicast technology. This will result in a loop free multicast distribution tree, where a source is sending data packets to receivers listening to a Multicast group. It is a conceivable idea to assume that the multicast-tree for the flow from the source to the Multicast group destination is translated into Replication Tags for the Multicast flow and are then distributed using routing and/or MPLS extensions. This will result in using traditional Multicast technology to be used to construct the Multicast distribution tree, while the associated replicate tags are used within the data plane.

According to an optional aspect of the invention, the network node is a router.

According to an optional aspect of the invention, the network node is a switch.

This way, the costs associated with the implementation of a network node according to the present invention are minimized.

According to a second aspect of the invention, there is provided a method for forwarding incoming data packets, comprising the steps of;
 identifying a tag of an incoming data packet as a replicate tag;
 retrieving from a tag table a number of replications and destinations for the replicate tag;
 replicating the incoming data packet according to the number of replications, thereby generating replicated data packets; and
 forwarding the replicated data packets to the destinations.

In accordance with the present invention, the replication of an incoming data packet by a network node is provided by the usage of a replicate tag. The replicate tag allows the network node to accept an ingress data packet and replicate this incoming data packet towards multiple destinations based upon the configured policies of its replicate tag. The use of a replicate tag according to the present invention therefore allows the building of engineered multicast distribution trees while minimizing the network state. This way, a service tree supports unicast traditional path engineering as described in the Internet-Draft and the capability to allow network based data packet replication to optimise traffic distribution trees in a programmatic approach allowing optimised traffic engineering.

Using a replicate tag according to the present invention allows the network node to perform traffic engineered network replication combining all the programmability provided by the segment routing as described in the Internet-Draft into the realm of multicast and network based packet replication. Using replicate tags indeed allows the distribution tree to be engineered based upon a traditional multicast distribution technology. Therefore, the resiliency demonstrated by this solution is similar to the resiliency currently demonstrated by traditional unicast segment routing framework. Additionally, the resiliency service is enhanced by the possible existence of several live-live flows of the same flow of data packets. Indeed, a network node according to the present invention may replicate an incoming data packet and forward both the incoming data packet and the one or more replicated data packets to the same destination, but following different paths. When leaving the network, the one or more copies of the incoming data packet and the incoming data packet are merged. Several flows of identical data packets will then flow in the network simultaneously and according to different paths, in order to increase the probability that the incoming data packet reaches its destination. Indeed, if a network node fails forwarding the incoming data packet, a copy of the incoming data packet will still flow in the network. Furthermore, the decoupling of the IP headers from the replication design in to the present invention allows the orchestration of the distribution tree. The replication tree for the incoming data packet is defined by the first tag that is imposed upon the incoming data packet. If the first tag is a traditional tag, such as for example a traditional segment routing identifier, then the incoming data packet is forwarded as traditional segment routing, while if the incoming data packet is imposed with a replicate tag, then the incoming data packet will be replicated by a network node according to the present invention upon the programmed distribution tree. Between network nodes which are configured to replicate incoming data packets according to their replicate tags, the data packets are unicast forwarded along the path following specification in the Internet-Draft routing. Additionally, traffic engineering in a network comprising one or more network nodes according to the present invention is possible by both the end-user and the service provider thanks to the use of replicate tags. In addition, an optimization of the path followed by an incoming data packet in the network is possible thanks to the use of replicate tags. The incoming data packet will indeed always follow the shortest path between a network node according to the present invention and the next network node towards its destination. Additionally, a network node according to the present invention minimizes the workload of virtual machines, performing the replication of incoming data packets instead of the virtual machines, and thereby ensuring the performance of the virtual machines.

According to a third aspect of the invention, there is provided a network node adapted to forward an incoming data packet, the network node comprising:
 a tag generating engine, configure to generate new replicate tags when plural destinations are associated with the incoming data packet; and
 a tag pushing module, adapted to embed one of the new replicate tags in a replicated data packet corresponding to the incoming data packet.

This way, a first network node of a network receiving an incoming data packet is adapted to identify the incoming data packet based upon a local policy. When plural destinations are associated with one of the replicated data packets, a new replicate tag is generated and embedded in one of the replicated data packets. The first network node of the network therefore generates new replicate tags and pushes one of these new replicate tags in a copy of the incoming data packet. In other words, a new replicate tag is encapsulated in each replicated data packet. The new replicate tags encapsulated in each replicated data packet are therefore different from each other. In other words, the tag generating engine generates different new replicate tags for each replicated data packet. A network node in the network which is not the first network node of the network generates new replicate tags when plural destinations are associated with the incoming data packet the network node receives. The network node then embeds one of these new replicate tags in a copy of the incoming data packet. In other words, the network node swaps the replicate tag of the incoming data packet by a new replicate tag in each copy of the incoming data packet, i.e. in each replicated data packet. Alternatively, each network node retrieves the new replicate tags from its tag table, and then embeds one of the new replicate tags in a replicated data packet corresponding to the incoming data packet. The destinations of the replicated data packets may be network nodes like intermediate nodes that again have to replicate the data packet, or may be the output ports of the current network node. A network node receiving one of the replicated data packet as an incoming data packet identifies the new replicate tag as a replicate tag, retrieves from its tag table a number of replications and destinations for the new replicate tag, replicates the replicated data packet and forwards the copies of the replicated data packet to the destinations, According to a fourth aspect of the invention, there is provided a method for forwarding an incoming data packet, the method comprising the steps of:
  generating new replicate tags when plural destinations are associated with the incoming data packet; and
  embedding one of the new replicate tags in a replicated data packet corresponding to the incoming data packet.

According to a fifth aspect of the invention, there is provided a network node adapted to forward incoming data packets, the network node comprising:
  a tag identifying unit, adapted to identify a tag of an incoming data packet as a replicate tag;
  a tag look-up module, adapted to retrieve from a tag table a number of replications and destinations for the replicate tag;
  a replicating engine, configured to replicate the incoming data packet according to the number of replications, thereby generating replicated data packets;
  a tag removing unit, adapted to remove the replicate tag from each of the replicated data packets; and
  a forwarding unit, adapted to forward the replicated data packets to the destinations.

This way, a last network node of a network, adapted to receive an incoming data packet and adapted to forward the incoming data packet to receivers outside the network, is further adapted to identify a tag of the incoming data packet as a replicate tag. The network node replicates the incoming data packet according to the number of replications for the replicate tag. The destinations of the replicated data packets may be clients or end-destinations of the multicast flow, or may be the output ports of the current network node. The network node removes the replicate tag from each of the replicated data packets and forwards the replicated data packets without replicate tags to the destinations. Alternatively, the network node swaps the replicate tag by a traditional tag, for example a traditional segment label.

According to a sixth aspect of the invention, there is provided a method for forwarding incoming data packets, the method comprising the steps of:
  identifying a tag of an incoming data packet as a replicate tag;
  retrieving from a tag table a number of replications and destinations for the replicate tag;
  replicating the incoming data packet according to the number of replications, thereby generating replicated data packets;
  removing the replicate tag from each of the replicated data packets; and
  forwarding the replicated data packets to the destinations.

According to a seventh aspect of the invention, there is provided a traffic flow controlling unit adapted to configure a traffic flow path for a multicast traffic flow through a network, the traffic flow controlling unit comprising:
  a traffic flow path determination unit, adapted to determine a traffic flow path for data packets belonging to the multicast traffic flow, thereby determining a number of replications and destinations for the data packets belonging to the multicast traffic flow in one or more network nodes in the network;
  a tag table generating unit, adapted to generate a tag table update associating a respective number of replications and respective destinations with respective replicate tags; and
  a tag table configuration unit, adapted to configure the tag table update in respective network nodes.

This way, the distribution tree can be built by a central controller being the traffic flow controlling unit. The traffic flow controlling unit identifies network nodes of the network which can replicate incoming data packets. The traffic flow controlling unit then determines a traffic flow path for data packets belonging to the multicast traffic flow. In other words, the traffic flow controlling unit determines through which network nodes the data packets of the traffic flow will progress through the network. Some of these network nodes are adapted to replicate incoming data packets. Each network node adapted to replicate incoming data packets and forward replicated data packets comprises a tag table. The tag table comprises a number of replications and destinations for replicate tags. The traffic flow controlling unit is adapted to generate tag table updates in order to update the tag table of one or more network nodes of the network, thereby associating a respective number of replications and respective destinations with respective replicate tags. These dynamic updates of the tag tables of the network nodes ensures the performance of the network nodes of the network is guaranteed and the network nodes perform replications of a data packet when required by the traffic flow controlling unit.

According to an eighth aspect of the invention, there is provided a method for configuring a traffic flow path for a multicast traffic flow through a network, the method comprising the steps of:
  determining a traffic flow path for data packets belonging to the multicast traffic flow, thereby determining a number of replications and destinations for the data packets belonging to the multicast traffic flow in one or more network nodes in said network;
  generating a tag table update associating a respective number of replications and respective destinations with respective replicate tags; and
  configuring the tag table update in respective network nodes.

DETAILED DESCRIPTION OF EMBODIMENT(S)

In the context of the following description, the expression "replicate tag" may be interpreted as a context construct representing a replication and traffic steering construct. For example, in an MPLS based network, a replicate tag may be interpreted as a MPLS label overloaded with replication and steering semantics. For example, in a segment routing network, a replicate tag may be interpreted as a replicate segment Identifier. For example in an IP based network, a replicate tag may be interpreted as flow identification parameters, such as IP source, IP destination, Protocol, destination port, source port, etc. For example in an application routed network, a replicate tag may be interpreted as an application based identifier. A replication tag allows data packets to be steered and replicated through the network and the devices of the network. It is thus clear that alternative replicate tags for alternative types of networks are also possible.

Figure 1:
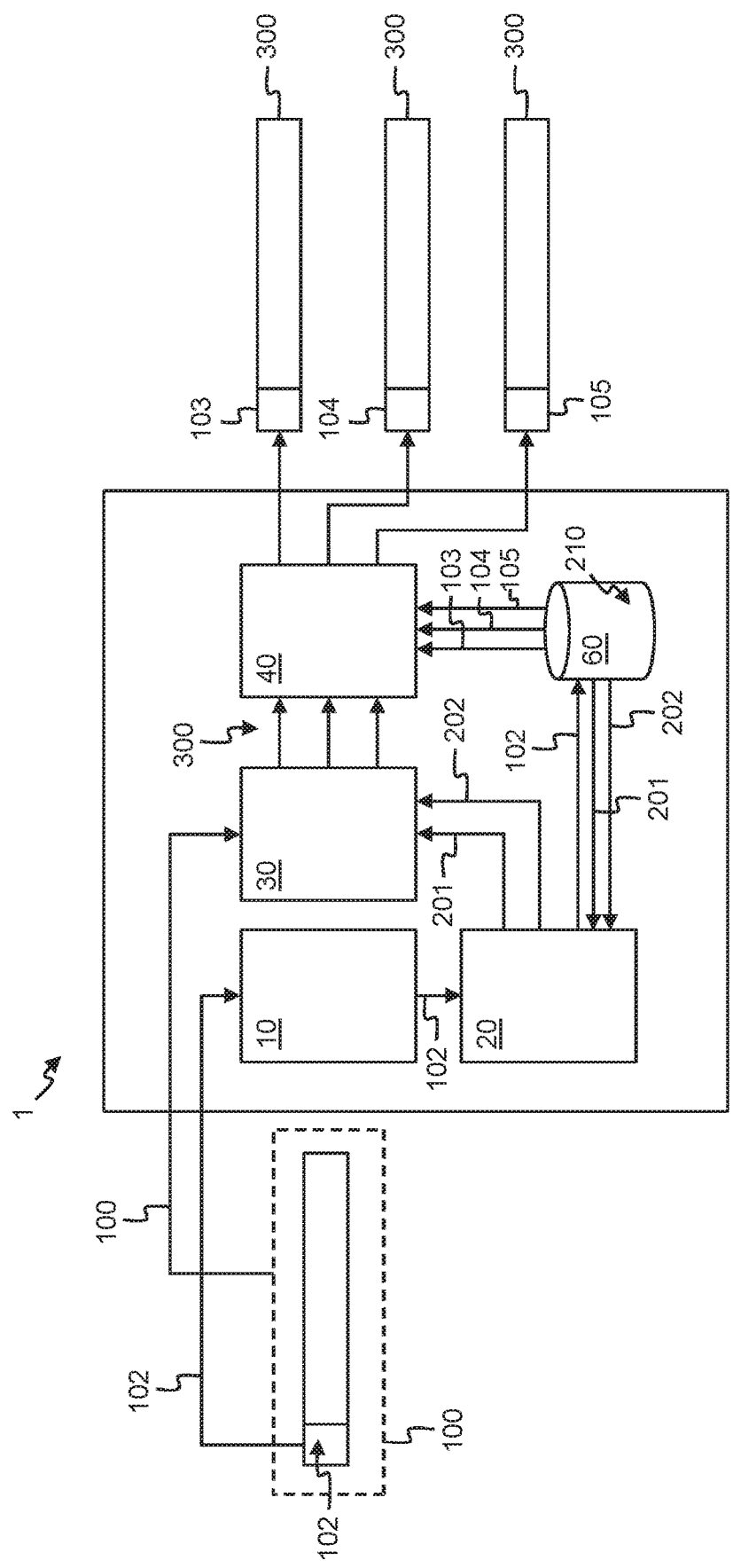
FIG. 1 schematically illustrates an embodiment of a network node according to the present invention, wherein the network node identifies a tag of an incoming data packet as a replicate tag.

According to an embodiment shown in FIG. 1, a network node 1 is adapted to forward an incoming data packet 100. According to an alternative embodiment, the network node 1 is adapted to forward a plurality of incoming data packets 100. The data packet 100 comprises a replicate tag 102. The network node 1 comprises a tag identifying unit 10, a tag look-up module 20, a replicating engine 30 and a forwarding unit 40. The tag identifying unit 10 identifies the tag of the incoming data packet 100 as a replicate tag 102. The tag look-up module 20 retrieves for the replicate tag 102 a number of replications 201 and destinations 202 from a tag table 210 stored in a database 60 of the network 1. The number of replications 201 for the replicate tag 102 of FIG. 1 is three. The replicating engine 30 replicates the incoming data packet 100 according to a number of replications 201, thereby generating three replicated data packets 300. The forwarding unit 40 forwards the three replicated data packets 300 to the destinations 202 for the replicate tag 102. The replicate tag 102 of FIG. 1 is a replicate segment identifier, also referred to as replicate segment ID. The tag table 210 stored in the database 60 of the network node 1 is manually configured. According to an alternative embodiment, the tag table 210 is configured by a traffic flow controlling unit. The network node 1 embeds a new replicate tag 103 in a first replicated data packet 300, embeds a new replicate tag 104 in a second replicated data packet 300 and embeds a new replicate tag 105 in a third replicated data packet 300. The new replicate tags 103;104;105 are retrieved from the tag table 210 for the replicate tag 102 and are different from each other. According to an alternative embodiment, the new replicate tags 103;104;105 are generated by the network node 1.

Figure 2:
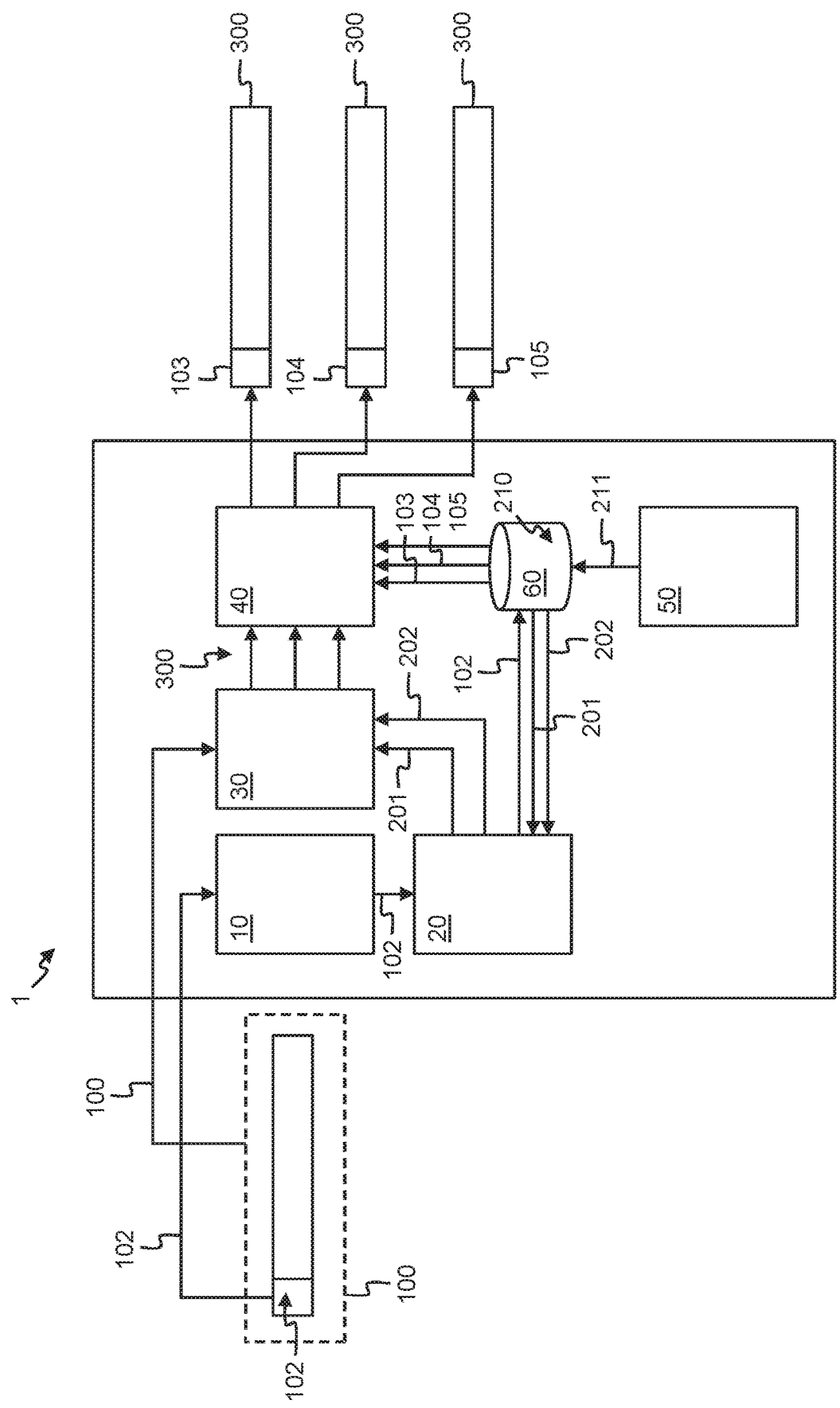
FIG. 2 schematically illustrates an embodiment of a network node according to the present invention, wherein the network node comprises a traffic flow controlling unit.

According to an embodiment shown in FIG. 2, a network node 1 is adapted to forward an incoming data packet 100. According to an alternative embodiment, the network node 1 is adapted to forward a plurality of incoming data packets 100. The data packet 100 comprises a replicate tag 102. The network node 1 comprises a tag identifying unit 10, a tag look-up module 20, a replicating engine 30 and a forwarding unit 40. The tag identifying unit 10 identifies the tag of the incoming data packet 100 as a replicate tag 102. The tag look-up module 20 retrieves for the replicate tag 102 a number of replications 201 and destinations 202 from a tag table 210 stored in a database 60 of the network 1. The number of replications 201 for the replicate tag 102 of FIG. 1 is three. The replicating engine 30 replicates the incoming data packet 100 according to a number of replications 201, thereby generating three replicated data packets 300. The forwarding unit 40 forwards the three replicated data packets 300 to the destinations 202 for the replicate tag 102. The replicate tag 102 of FIG. 1 is a replicate segment identifier, also referred to as replicate segment ID. The network node 1 further comprises a traffic flow controlling unit 50 which configures a tag table update 211 in order to update the tag table 210. According to an alternative embodiment, the traffic flow controlling unit 50 is an entity of the network 2. The network node 1 embeds a new replicate tag 103 in a first replicated data packet 300, embeds a new replicate tag 104 in a second replicated data packet 300 and embeds a new replicate tag 105 in a third replicated data packet 300. The new replicate tags 103;104;105 are retrieved from the tag table 210 for the replicate tag 102 and are different from each other. According to an alternative embodiment, the new replicate tags 103;104;105 are generated by the network node 1.

Figure 3:
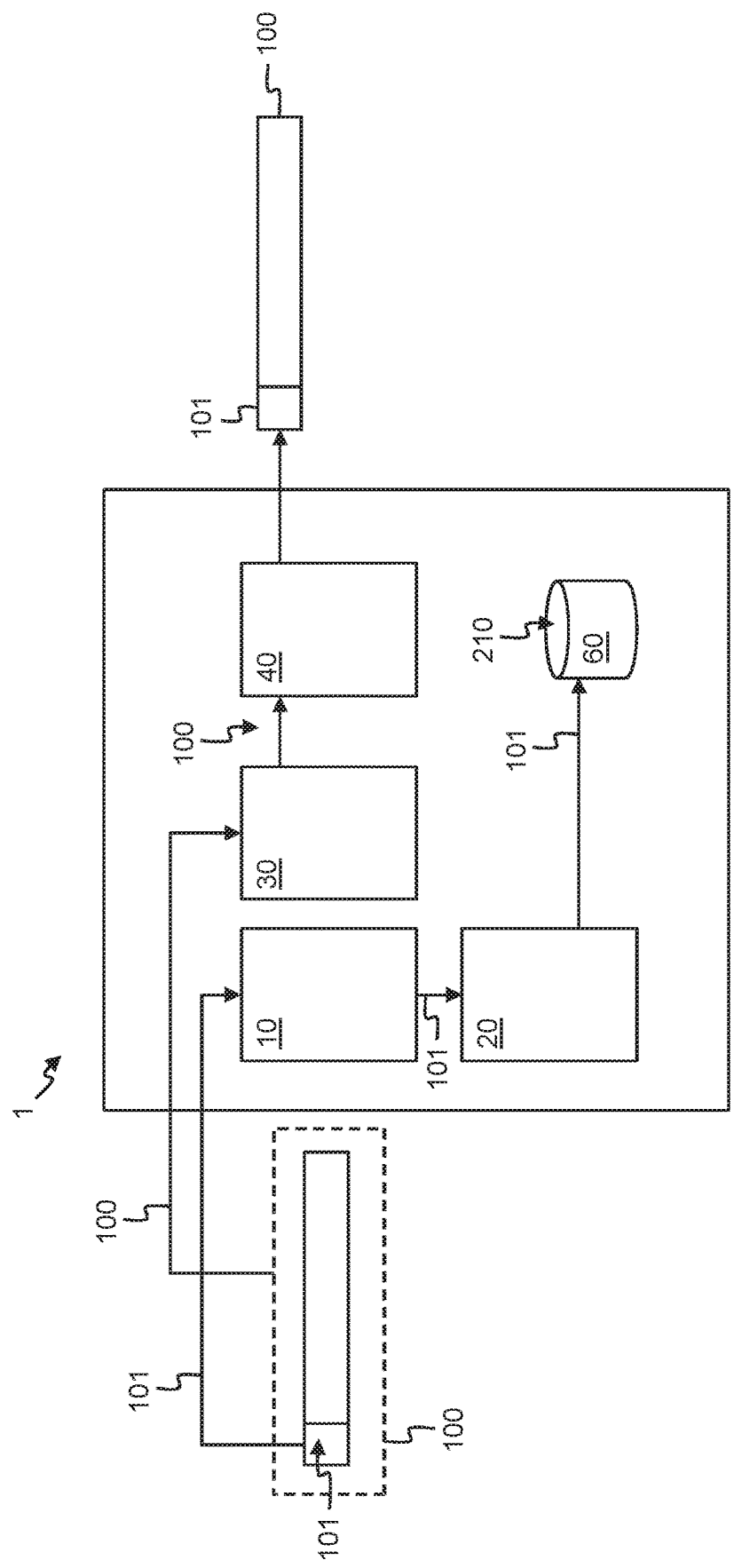
FIG. 3 schematically illustrates an embodiment of a network node according to the present invention, wherein the network node identifies a tag of an incoming data packet.

According to an embodiment shown in FIG. 3, a network node 1 is adapted to forward an incoming data packet 100. According to an alternative embodiment, the network node 1 is adapted to forward a plurality of incoming data packets 100. The data packet 100 comprises a tag 101. The network node 1 comprises a tag identifying unit 10, a tag look-up module 20, a replicating engine 30 and a forwarding unit 40. The tag identifying unit 10 identifies the tag 101 of the incoming data packet 100. The tag look-up module 20 looks up the tag 101 in a tag table 210 stored in a database 60 of the network 1, but the tag look-up module 20 does not identify a corresponding a number of replications 201 and destinations 202 for the tag 101. The network node 1 therefore does not identify the tag 101 of the incoming data packet 100 as a replicate tag 102, and the network node 1 drops the incoming data packet 100.

Figure 4:
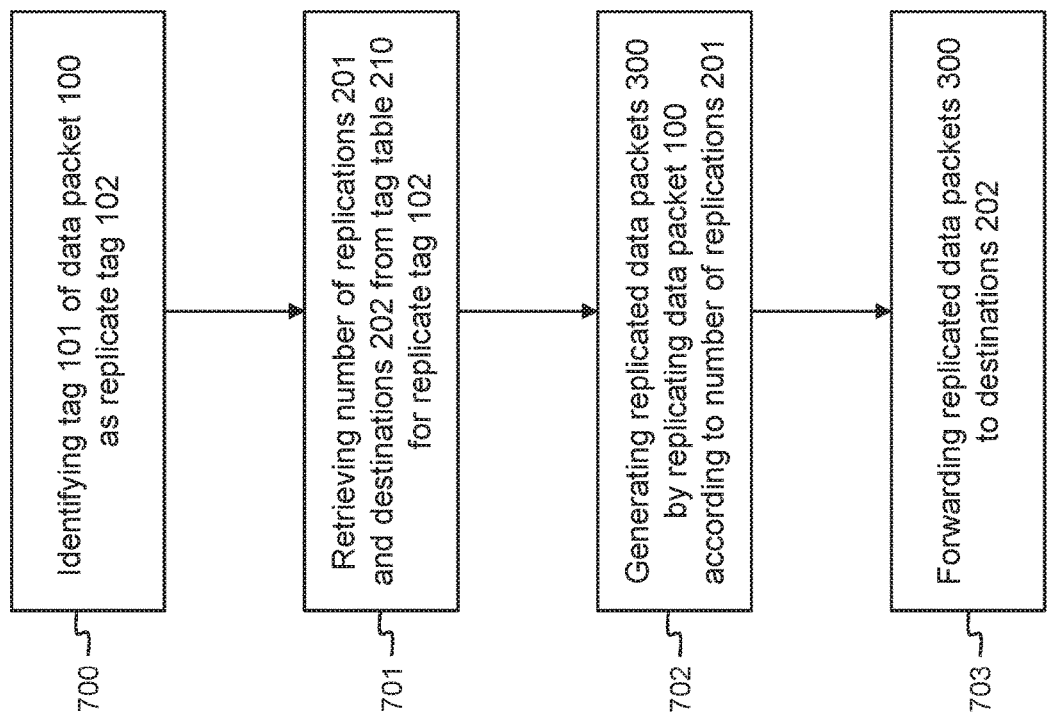
FIG. 4 schematically illustrates the steps of the method according to the present invention.

FIG. 4 schematically illustrates the steps of the method according to the present invention. In step 700, a tag 101 of an incoming data packet 100 is identified as a replicate tag 102. A number of replications 201 and destinations 202 are then retrieved in step 701 from a tag table 210 for the replicate tag 102. The incoming data packet 100 is then replicated according to the number of replications 201, thereby generating replicated data packets 300 in step 702. Finally, in step 703, the replicated data packets 300 are forwarded to the destinations 202.

Figure 5:
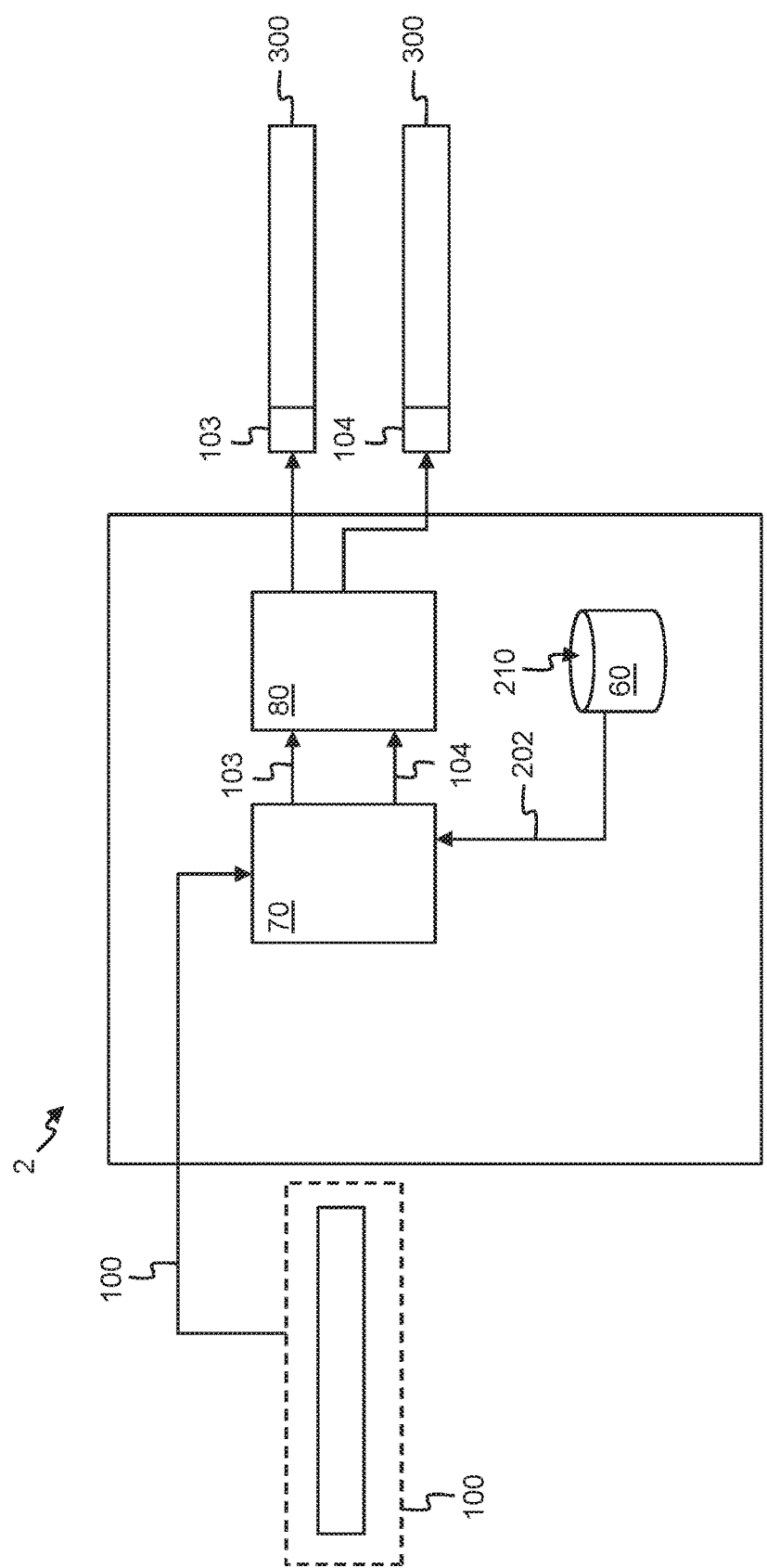
FIG. 5 schematically illustrates an embodiment of a network node according to the present invention, wherein the network node generates new replicate tags.

According to an embodiment shown in FIG. 5, a network node 2 receiving an incoming data packet 100 is adapted to identify the incoming data packet 100 based upon a local policy. The network node 2 comprises a tag generating engine 70 and a tag pushing module 80. When plural destinations 202 are associated with one of the replicated data packets 300 corresponding to the incoming data packet 100, the tag generating engine 70 generates new replicate tags 103;104 and embeds one new replicate tag 103;104 in each one of the replicated data packets 300. According to an alternative embodiment, the new replicate tags 103;104 are retrieved from the tag table 210 of the memory 60 of the network node 2.

Figure 6:
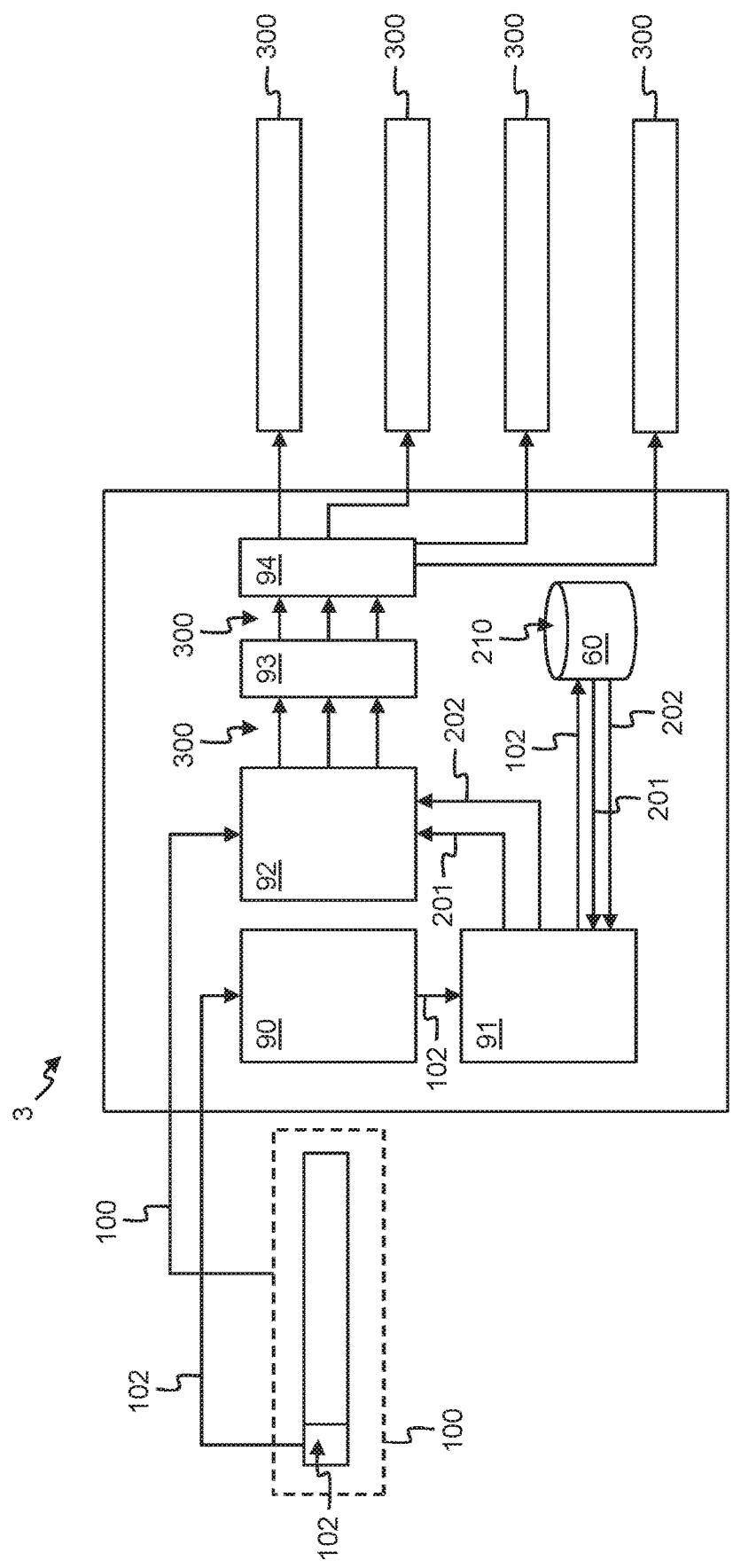
FIG. 6 schematically illustrates an embodiment of a network node according to the present invention, wherein the network node removes replicate tags from data packets.

According to an embodiment shown in FIG. 6, a network node 3 is adapted to forward an incoming data packet 100. According to an alternative embodiment, the network node 3 is adapted to forward a plurality of incoming data packets 100. The data packet 100 comprises a replicate tag 102. The network node 3 comprises a tag identifying unit 90, a tag look-up module 91, a replicating engine 92, a tag removing unit 93 and a forwarding unit 94. The tag identifying unit 90 identifies the tag of the incoming data packet 100 as a replicate tag 102. The tag look-up module 91 retrieves for the replicate tag 102 a number of replications 201 and destinations 202 from a tag table 210 stored in a database 60 of the network 3. The number of replications 201 for the replicate tag 102 of FIG. 6 is four. The replicating engine 92 replicates the incoming data packet 100 according to a number of replications 201, thereby generating four replicated data packets 300. The tag removing unit 93 removes the replicate tags 102 from each replicated data packet 300. The forwarding unit 94 forwards the four replicated data packets 300 to the destinations 202 for the replicate tag 102 without replicate tags, thereby forwarding untagged replicated data packets 300. The replicate tag 102 of FIG. 6 is a replicate segment identifier, also referred to as replicate segment ID. The tag table 210 stored in the database 60 of the network node 1 is manually configured. According to an alternative embodiment, the tag table 210 is configured by a traffic flow controlling unit. The network node 1 embeds a new replicate tag 103 in a first replicated data packet 300, embeds a new replicate tag 104 in a second replicated data packet 300 and embeds a new replicate tag 105 in a third replicated data packet 300. The new replicate tags 103:104; 105 are retrieved from the tag table 210 for the replicate tag 102 and are different from each other. According to an alternative embodiment, the new replicate tags 103;104;105 are generated by the network node 1.

Figure 7:
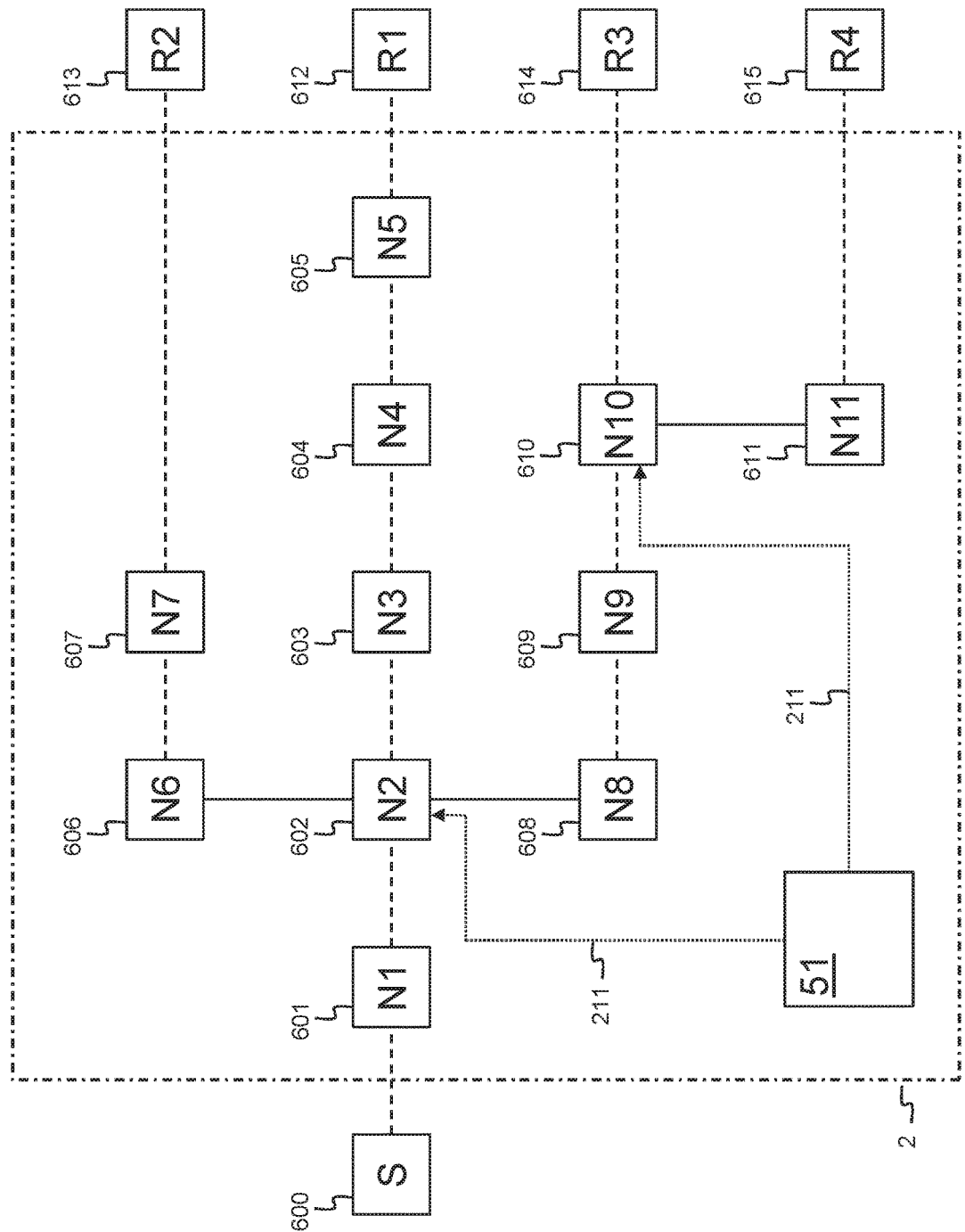
FIG. 7 schematically illustrates an embodiment of a programmable network based multicast replication.

According to an embodiment shown in FIG. 7, a source 600 labelled S sends data packets to receivers 612;613;614; 615 respectively labelled R1, R2, R3 and R4, through a network 4. The source 600 is sending data packets as traditional multicast data packets without any tag. In other words, the data packets sent by the source 600 over the network 4 are unlabeled. The network 4 comprises 11 network nodes 601 to 611, respectively labelled N1 to N11. The only network nodes that are aware of the replication context of replicate tags, i.e. that can identify replicate tags of incoming data packets, are the network nodes 602 and 610 respectively labelled N2 and N10. The data packets between the network nodes 602;610 labelled N2 and N10 follow traditional unicast paths in the network 4. For example, data packets between the network nodes 608 and 609 respectively labelled N8 and N9 follow a tradition unicast path. The network node 601 labelled N1 is adapted to identify incoming data packets based upon a local policy of the network 4. The network node 601 labelled N1 then generates a new replicate tag and pushes the new replicate tag in the data packet. Both the nodes 602;610 labelled N2 and N10 comprise a tag identifying unit, a tag look-up module, a replicating engine and a forwarding unit. The network 4 further comprises a traffic flow controlling unit 51 which determines a traffic flow path for data packets belonging to a multicast traffic flow, thereby determining a number of replications and destinations for the data packets belonging to the multicast traffic flow in the network nodes 602;610 respectively labelled N2 and N10 in the network 4. The traffic flow controlling unit 51 further configures tag table updates 211 in order to configure the respective tag tables 210 of the network nodes 602;610 labelled N2 and N10 in function of the number of replications and the destinations of the data packets belonging to the multicast traffic flow. When the network node 602 labelled N2 receives a data packet with a replicate tag, the tag identifying unit of the network node 602 labelled N2 identifies the tag as a replicate tag. The tag look-up module of the network node 602 labelled N2 retrieves from its tag table a number of replications and destinations for the replicate tag. The replicating engine of the network node 602 labelled N2 replicates the data packet according to the number of replications, thereby generating three replicated data packets. The network node 602 labelled N2 further generates three new replicate tags for the replicated data packets, and swaps the replicate tag of the incoming data packet by one new replicate tag in each of the replicated data packets. According to an alternative embodiment, the network node 602 labelled N2 fetches the new replicate tags from the tag table of the network node 602 labelled N2. The forwarding unit of the network node 602 labelled N2 forwards a first replicated data packet with a new replicate tag to the destination corresponding to the receiver 612 labelled R1, forwards a second replicated data packet with a new replicate tag to the destination corresponding to the receiver 613 labelled R2, and forwards a third replicated data packet with a new replicate tag to the destination corresponding to the network node 610 labelled N10. The first replication will then send the replicated data packet to the receiver 612 labelled R1, and hence either traditional shortest path routing or a traffic flow path determined by the traffic flow controlling unit 51 is used. The network nodes 603;604;605 respectively labelled N3;N4;N5 switch the data packet based upon the tag 102 of the replicated data packet 300, like any other unicast data packet. The network nodes 603;604;605 respectively labelled N3; N4; N5 are not aware that the replicated data packet they are switching was the result of a network based replication performed by the network node 602 labelled N2. The second replication will then send the replicated data packet to the receiver 613 labelled R2, and hence either traditional shortest path routing or a traffic flow path determined by the traffic flow controlling unit 51 is used. The network nodes 606;607 respectively labelled N6;N7 switch the replicated data packet based upon the tag of the replicated data packet, like any other unicast data packet. The network nodes 606;607 respectively labelled N6;N7 are not aware that the replicated data packet they are switching was the result of a network based replication performed by the network node 602 labelled N2. The third replication will then send the replicated data packet to the network node 610 labelled N10. The network nodes 608;609 respectively labelled N8;N9 are not aware that the replicated data packet they are switching was the result of a network based replication performed by the network node 602 labelled N2. When the replicated data packet of the third replication is received on the network node 610 labelled N10, the tag identifying unit of the network node 610 labelled N10 identifies the tag as a replicate tag. The tag look-up module of the network node 610 labelled N10 retrieves from its tag table a number of replications and destinations for the replicate tag. The replicating engine of the network node 610 labelled N10 replicates the incoming data packet according to the number of replications, thereby generating two replicated data packets. The removing unit of the network node 610 labelled N10 removes the replicate tag of the replicated data packet and the forwarding unit of the network node 610 labelled N10 forwards a first replicated data packet to the destination corresponding to the receiver 614 labelled R3. The removing unit of the network node 610 labelled N10 further removes the replicate tag of the second replicated data packet and the forwarding unit of the network node 610 labelled N10 forwards the second replicated data packet to the destination corresponding to the receiver 615 labelled R4. The network node 611 labelled N11 is not aware that the replicated data packet it is switching was the result of a network based replication performed by the network node 610 labelled N10.

Figure 8:
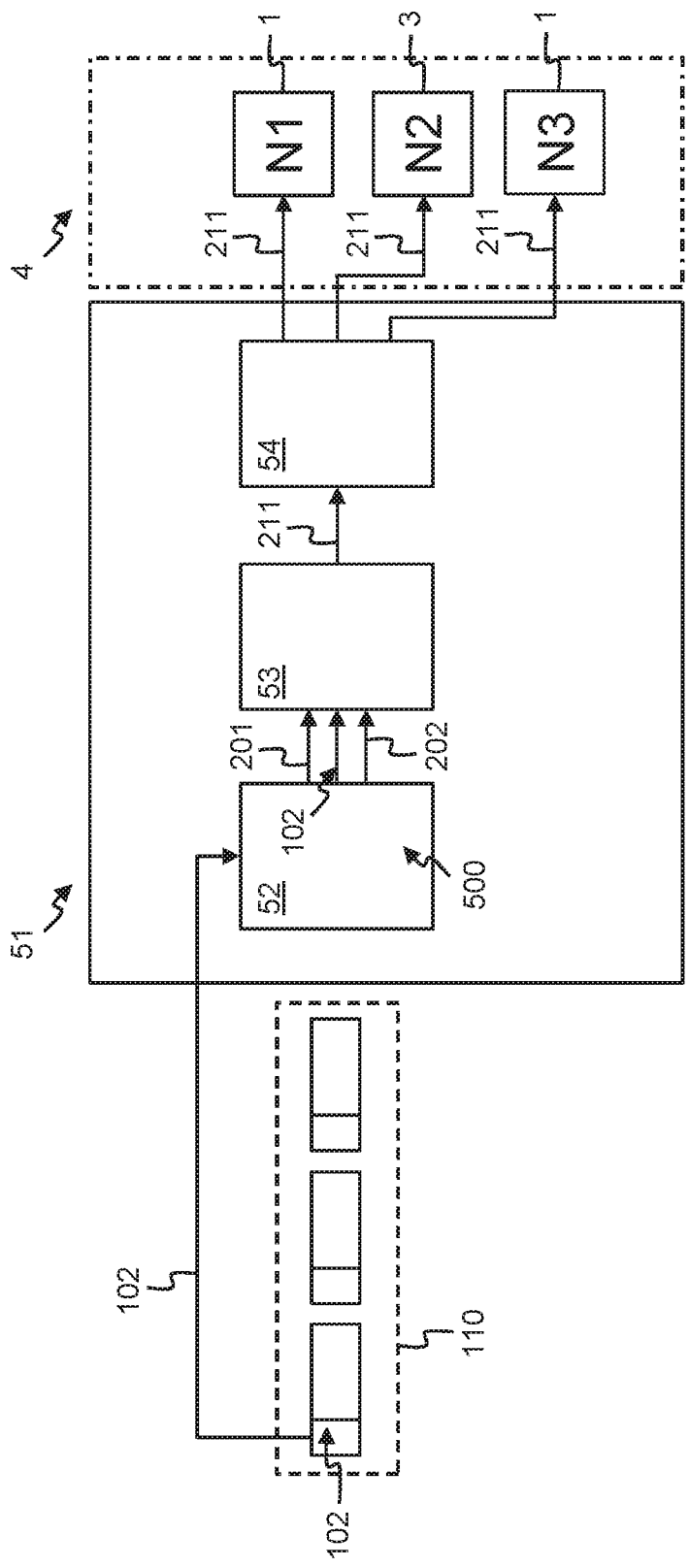
FIG. 8 schematically illustrates an embodiment of a traffic flow controlling unit according to the present invention.

According to an embodiment shown in FIG. 8, a traffic flow controlling unit 51 is adapted to configure a traffic flow path 500 for a multicast traffic flow 110 through a network 4. The traffic flow controlling unit 51 comprises a traffic flow path determination unit 52 that determines a traffic flow path 500 for data packets 100 of the multicast traffic flow 110, thereby determining a number of replications 201 and destinations 202 for the data packets 100 belonging to the multicast traffic flow 110 in one or more network nodes 1;3 of the network 4. The traffic flow controlling unit 51 further comprises a tag table generating unit 53 that generates a tag table update 211 associating a respective number of replications 201 and respective destinations 202 with respective replicate tags 102. The traffic flow controlling unit 54 configures the tag table update 211 in respective network nodes 1;3 labelled N1, N2 and N3 of the network 4.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A multicast network node adapted to forward incoming multicast data packets, the multicast network node comprising:
    at least one processor configured to,
    receive an incoming multicast data packet, the incoming multicast data packet including a destination;
    identify a tag of the incoming multicast data packet as a replicate tag, the replicate tag indicating the incoming multicast data packet must be replicated;
    determine a number of times to replicate the incoming multicast data packet and network paths for transmitting each of the replicated multicast data packet based on the replicate tag and a tag table;
    replicate the incoming multicast data packet according to the determined number of replications to generate replicated multicast data packets; and
    forward each of the replicated multicast data packets and the incoming multicast data packet to the destination along their respective network paths.

2. The multicast network node according to claim 1, wherein the replicate tag is a replicate segment identifier (ID).

3. The multicast network node according to claim 1, wherein the tag table is manually configured.

4. The multicast network node according to claim 1, wherein the at least one processor is further configured to configure the tag table based on network traffic flow information.

5. The multicast network node according to claim 1, wherein the multicast network node is a router.

6. The multicast network node according to claim 1, wherein the multicast network node is a switch.

7. A method for forwarding incoming multicast data packets, the method comprising:
    receiving an incoming multicast data packet, the incoming multicast data packet including a destination;
    identifying a tag of the incoming multicast data packet as a replicate tag, the replicate tag indicating the incoming multicast data packet must be replicated;
    determining a number of times to replicate the incoming multicast data packet and network paths for transmitting each of the replicated multicast data packet based on the replicate tag and a tag table;
    replicating the incoming multicast data packet according to the determined number of replications, to generate replicated multicast data packets; and
    forwarding each of the replicated multicast data packets and the incoming multicast data packet to the destination along their respective network paths.

8. The method according to claim 7, the method comprising:
    generating new replicate tags when plural destinations are associated with the incoming multicast data packet; and
    embedding one of the new replicate tags in one replicated multicast data packet corresponding to the incoming multicast data packet.

9. The method according to claim 7, the method further comprising:
    removing the replicate tag from each of the replicated multicast data packets.

10. A traffic flow controlling device adapted to configure a traffic flow path for a multicast traffic flow through a multicast network, the traffic flow controlling device comprising:

at least one processor configured to,
determine a traffic flow path for multicast data packets belonging to the multicast traffic flow, the determining the traffic flow path including determining a number of replications, destinations, and network paths for transmitting a respective multicast data packet for the multicast data packets belonging to the multicast traffic flow in one or more multicast network nodes in the multicast network;
generate a tag table update associating a respective number of replications, respective destinations, and respective network paths with respective replicate tags, each of the replicate tags indicating that a respective multicast data packet must be replicated; and
configure the tag table update in respective multicast network nodes.

11. A method for configuring a traffic flow path for a multicast traffic flow through a multicast network, the method comprising:
determining a traffic flow path for multicast data packets belonging to the multicast traffic flow, the determining the traffic path flow including determining a number of replications, destinations, and network paths for transmitting a respective multicast data packet for the multicast data packets belonging to the multicast traffic flow in one or more multicast network nodes in the multicast network;
generating a tag table update associating a respective number of replications, respective destinations, and network paths with respective replicate tags, each of the replicate tags indicating that a respective multicast data packet must be replicated; and
configuring the tag table update in respective multicast network nodes.

12. The multicast network node according to claim 1, wherein the at least one processor is further configured to:
generate new replicate tags when plural destinations are associated with the incoming multicast data packet; and
embed one of the new replicate tags in one replicated multicast data packet corresponding to the incoming multicast data packet.

13. The multicast network node according to claim 1, wherein the at least one processor is further configured to:
remove the replicate tag from each of the replicated multicast data packets.

* * * * *